(12) United States Patent
Wu et al.

(10) Patent No.: US 9,779,143 B2
(45) Date of Patent: Oct. 3, 2017

(54) INFORMATION PUSHING METHOD AND APPARATUS

(71) Applicant: TENCENT TECHNOLOGY (SHENZHEN) COMPANY LIMITED, Shenzhen (CN)

(72) Inventors: Zhijian Wu, Shenzhen (CN); Jia Wang, Shenzhen (CN); Bin Chen, Shenzhen (CN); Xuejiao Deng, Shenzhen (CN); Wuquan Qin, Shenzhen (CN); Ziming Zhuang, Shenzhen (CN); Yong Zou, Shenzhen (CN); Song Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 205 days.

(21) Appl. No.: 14/429,798

(22) PCT Filed: Sep. 22, 2013

(86) PCT No.: PCT/CN2013/083887
§ 371 (c)(1),
(2) Date: Mar. 20, 2015

(87) PCT Pub. No.: WO2014/048277
PCT Pub. Date: Apr. 3, 2014

(65) Prior Publication Data
US 2015/0248412 A1    Sep. 3, 2015

(30) Foreign Application Priority Data
Sep. 29, 2012    (CN) .......................... 2012 1 0374753

(51) Int. Cl.
G06F 17/30    (2006.01)

(52) U.S. Cl.
CPC .... *G06F 17/3053* (2013.01); *G06F 17/30867* (2013.01)

(58) Field of Classification Search
CPC ........... G06F 17/30867; G06F 17/3053; G06F 2221/2137; G06Q 30/0255;
(Continued)

(56) References Cited

U.S. PATENT DOCUMENTS 7,827,170 B1 * 11/2010 Horling ............... G06F 17/3053
707/722
8,521,594 B1 * 8/2013 Skoe ..................... G06Q 30/02
705/14.66
(Continued)

FOREIGN PATENT DOCUMENTS

| CN | 101179625 A | 5/2008 |
|---|---|---|
| CN | 101193037 A | 6/2008 |

(Continued)

OTHER PUBLICATIONS

English Translation of Japanese Notice of Reasons for Rejection from Application No. 2015-533427 dated Aug. 27, 2015.
(Continued)

*Primary Examiner* — Thanh-Ha Dang
(74) *Attorney, Agent, or Firm* — Marshall, Gerstein & Borun LLP

(57) ABSTRACT

The present application provides an information pushing method and apparatus. The method comprises: collecting a pushing parameter of each piece of information pushed in a time segment T, the pushing parameter comprising information pushing time, an information pushing user, or the number of times of the information being accessed; determining, according to the collected pushing parameter, an information access parameter of each user in the time segment T, the information access parameter comprises at
(Continued)

least: the number of times of the information being visited in the time segment T, an information access tendency, and time of a last access of the information in T, and the information access tendency being determined by the number of times of the information being accessed; and selecting, according to the information access parameter of each user in the time segment T, a target user meeting a requirement, and pushing information to the target user.

16 Claims, 2 Drawing Sheets

(58) Field of Classification Search
CPC .......... G06Q 30/0269; G06Q 30/0271; G06Q 30/0277; H04L 51/32; H04L 67/22; H04L 67/306
USPC ........................................................ 707/749
See application file for complete search history.

(56) References Cited

U.S. PATENT DOCUMENTS

| | | | | |
|---|---|---|---|---|
| 9,519,906 | B2* | 12/2016 | Anisimov | G06F 17/30899 |
| 9,589,270 | B2* | 3/2017 | Weiss | G06Q 10/00 |
| 2004/0167981 | A1* | 8/2004 | Douglas | H04L 41/12 |
| | | | | 709/225 |
| 2007/0288336 | A1* | 12/2007 | Malaviya | G06Q 40/00 |
| | | | | 705/35 |
| 2010/0211464 | A1* | 8/2010 | Zhu | G06Q 30/0255 |
| | | | | 705/14.53 |
| 2010/0299431 | A1* | 11/2010 | Vanderhook | G06Q 30/02 |
| | | | | 709/224 |
| 2011/0040848 | A1* | 2/2011 | Xu | G06Q 50/01 |
| | | | | 709/213 |
| 2011/0093515 | A1* | 4/2011 | Albanese | G06Q 30/02 |
| | | | | 707/812 |
| 2012/0047011 | A1* | 2/2012 | Rippetoe | G06Q 30/02 |
| | | | | 705/14.45 |
| 2012/0166432 | A1* | 6/2012 | Tseng | G06F 17/30867 |
| | | | | 707/728 |
| 2012/0166530 | A1* | 6/2012 | Tseng | G06Q 30/0255 |
| | | | | 709/204 |
| 2012/0232951 | A1* | 9/2012 | Su | G06Q 30/0241 |
| | | | | 705/7.29 |
| 2012/0239507 | A1* | 9/2012 | Braginsky | G06Q 10/10 |
| | | | | 705/14.69 |
| 2013/0094756 | A1* | 4/2013 | Li | G06Q 30/00 |
| | | | | 382/155 |
| 2013/0124449 | A1* | 5/2013 | Pinckney | G06F 17/30867 |
| | | | | 706/52 |

FOREIGN PATENT DOCUMENTS

| | | |
|---|---|---|
| CN | 101986298 A | 3/2011 |
| CN | 102681999 A | 9/2012 |
| JP | 2002170046 A | 6/2002 |
| JP | 2003224843 A | 8/2003 |
| JP | 2012141785 A | 7/2012 |
| WO | WO-2012073470 A1 | 6/2012 |

OTHER PUBLICATIONS

International Preliminary Report on Patentability from International Application No. PCT/CN2013/083887 dated Sep. 22, 2013.
Written Opinion (English translation), International Application No. PCT/CN2013/083887, dated Dec. 26, 2013.
Search Report in International Application No. PCT/CN2013/083887 dated Dec. 26, 2013.

* cited by examiner

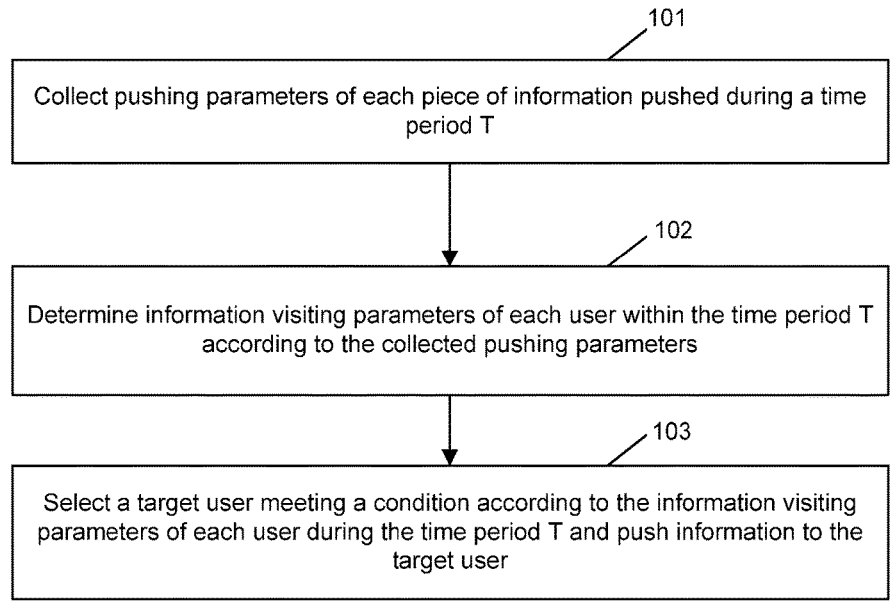

FIG. 1

| Name of fields | Meanings of fields | type |
| --- | --- | --- |
| statis_month | month | NUMBER |
| user_id | User identifier | NUMBER |
| push_num | Number of pieces of information pushed to the user | NUMBER |
| click_num | Number of pieces of information clicked by the user | NUMBER |
| click_rate | Information clicking ratio= (Number of pieces of information clicked by the user) / (Number of pieces of information pushed to the user) | NUMBER |
| Trend_click_rate | Information visiting trend | NUMBER |
| Last_click_date | Time of last visit during time period T | NUMBER |

FIG. 2

INFORMATION PUSHING METHOD AND APPARATUS

CROSS-REFERENCE TO RELATED APPLICATIONS

This is the U.S. national phase of International Application No. PCT/CN2013/083887 filed on Sep. 22, 2013, which claims priority to Chinese patent application No. 201210374753.X, filed on Sep. 29, 2012, the entire respective disclosures of which are incorporated herein by reference.

FIELD OF THE DISCLOSURE

The present disclosure relates to Internet techniques, and more particularly, to a method and an apparatus for pushing information.

BACKGROUND OF THE DISCLOSURE

Information push is a new technique on mobile Internet. Information being pushed may be an advertisement or include other contents. In a current information push method, an information manager (e.g. advertising and marketing personnel) manually selects target users from a user database, e.g., selects potential users meeting relevant conditions (such as age, gender, job, hobby, income, region, etc.) as the target users. Thereafter, information is pushed to the selected target users, such that the target users visit the pushed information as much as possible.

SUMMARY OF THE DISCLOSURE

Examples of the present disclosure provide a method and an apparatus for pushing information, so as to select a target user automatically and push information to the target user and increase an information clicking ratio.

According to an example of the present disclosure, a method for pushing information includes:

collecting pushing parameters of each piece of information pushed during a time period T, wherein the pushing parameters comprises time that the information is pushed, users that the information is pushed to, and times that the information is visited;

determining information visiting parameters of each user within the time period T according to the collected pushing parameters, wherein the information visiting parameters comprise at least: number of pieces of information visited by the user within the time period T, an information visiting trend and time of last visit within the time period T, the information visiting trend is determined by the number of pieces of information visited by the user; and selecting a target user meeting a condition according to the information visiting parameters of each user within the time period T, and pushing information to the target user.

According to another example of the present disclosure, an apparatus for pushing information includes:

a collecting module, to collect pushing parameters of each piece of information pushed within a time period T, wherein the pushing parameters comprise: time that the information is pushed, users to which the information is pushed and times that the information is clicked;

a determining module, to determine information visiting parameters of each user within the time period T according to the collected pushing parameters, wherein the information visiting parameters comprise at least: number of pieces of information visited by the user, information visiting trend and time of last visit during the time period T, the information visiting trend is determined according to the number of pieces of information visited by the user;

a target user selecting module, to select a target user meeting a condition according to the information visiting parameters of each user during the time period T; and a pushing module, to push information to the target user selected by the target user selecting module.

According to still another example of the present disclosure, an apparatus for pushing information includes: a processor and a memory, wherein the memory comprises machine readable instructions executable by the processor to perform acts of:

collecting pushing parameters of each piece of information pushed during a time period T, wherein the pushing parameters comprises time that the information is pushed, users that the information is pushed to, and times that the information is visited;

determining information visiting parameters of each user within the time period T according to the collected pushing parameters, wherein the information visiting parameters comprise at least: number of pieces of information visited by the user within the time period T, an information visiting trend and time of last visit within the time period T, the information visiting trend is determined by the number of pieces of information visited by the user; and selecting a target user meeting a condition according to the information visiting parameters of each user within the time period T, and pushing information to the target user.

In view of the above technical solution, in the examples of the present disclosure, pushing parameters of each piece of information are collected. According to the collected pushing parameters, information visiting parameters of each user within a time period T are determined. As such, when pushing information, it is possible to automatically select a target user meeting a condition according to the information visiting parameters of each user within the time period T and then push the information to the target user. Compared with the conventional technique, automatic selection of the target user is realized. Problems such as operation difficulty brought out by manual selection of the target user are overcome. Further, the present disclosure takes previous visiting information of the users to guide the selection of the target user, which is more likely to select the target user who would like to visit the information and increases the information clicking ratio.

BRIEF DESCRIPTION OF THE DRAWINGS

FIG. 1 shows an example of a method according to the present disclosure.

FIG. 2 shows exemplary information visiting parameters according to the present disclosure.

DETAILED DESCRIPTION OF THE DISCLOSURE

Figure 3:
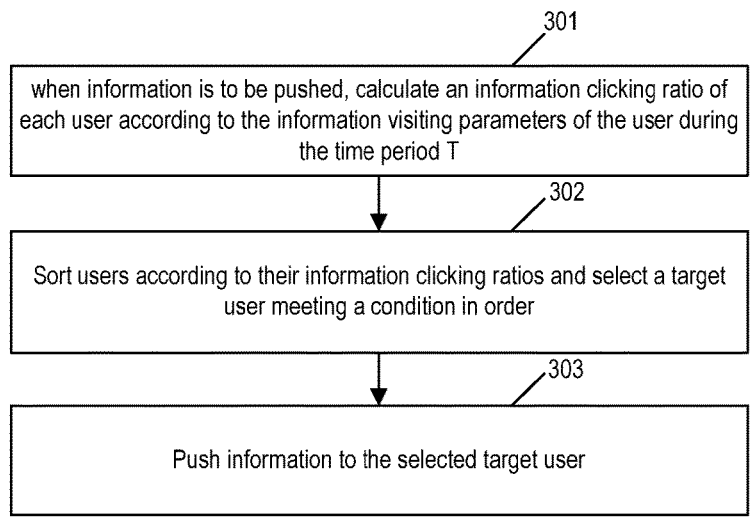
FIG. 3 shows an example of block 103 according to the present disclosure.

The present disclosure is described in further detail hereinafter with reference to accompanying drawings and examples to make the technical solution and merits therein clearer.

In current information push method, an information manager manually selects target users from a user database. This information push method mainly has the following defect: since the information manager selects the target users manually, the operation is rather complex and is subjective. It is impossible to find target users precisely, which decreases information clicking ratio of the users and affects traffic amount of the pushed information.

In view of the above, an example of the present disclosure provides a method for pushing information. In the method provided by the example of the present disclosure, when pushing information, history visiting information of users is used to guide the selection of the target user, so as to realize automatic selection of the target user. In addition, since the selection of the target user relies on the history visiting information of the users, clicking ratio of the user to the pushed information is increased.

Hereinafter the method provided by the example of the present disclosure is described.

FIG. 1 shows an example of a method according to the present disclosure. As shown in FIG. 1, the method includes the following.

At block 101, pushing parameters of each piece of information pushed during a time period T are collected, wherein the pushing parameters include: time that the information is pushed, target user of the information, and number of times that the information is clicked.

In the example of the present disclosure, the information may be an advertisement or include other contents, which is not restricted in the present disclosure. The duration of the time period T may be configured according to a practical requirement, e.g., a recent week, a recent month, etc., which is also not restricted in the present disclosure.

In addition, in order to ensure accuracy of the collected pushing parameters of each piece of pushed information, in the example of the present disclosure a lifecycle may be configured for each piece of information being pushed, e.g., three days. The pushing parameters of the information are collected within the lifecycle. During the lifecycle, information consistent with this information is not pushed again.

In the example of the present disclosure, in order to find the target user more accurately, the pushing parameters may further include: information pushed times, i.e., the number of times that the information is pushed to the users.

At block 102, according to the collected pushing parameters, information visiting parameters of each user within the time period T are determined, wherein the information visiting parameters include at least: number of pieces of information visited by the user, information visiting trend and time of last visit within the time period T, wherein the information visiting trend is determined by the number of pieces of information visited by the user.

The closer that the time of last visit within the time period T is to an end point of the time period T, the more frequently that the user visits information; contrariwise, it indicates that the user has not visited any information for a long time. If the user does not click any information within the time period, the time of last visit is denoted by 0.

In the example of the present disclosure, in the case that the pushing parameters further include the information pushed times, the information visiting parameters may further include: times that the information is pushed to the user.

In the example of the present disclosure, in order to exhibit the information clicking ratio of the user within the time period T, the information visiting parameters of the user during the time period T may further include the information clicking ratio. The information clicking ratio may be a quotient of the number of pieces of information visited by the user and the number of pieces of information pushed to the user during the time period T. The higher the information clicking ratio, the larger the possibility that the user clicks the information; otherwise, the smaller the possibility that the user clicks the information.

Based on the above contents of the information visiting parameters, suppose that the time period T is one month, FIG. 2 shows an example of the information visiting parameters of the user within one month.

In addition, in the example of the present disclosure, the information visiting trend of the user during the time period T may be determined according to various manners, two of them are described hereinafter.

In a first manner, the information visiting trend is determined according to the following.

A difference between the number of pieces of information visited by the user during a second half of the time period T and the number of pieces of information visited by the user during a first half of time period T is calculated. The calculated result is used for denoting the information visiting trend. If the calculated result is a negative value, the information visiting trend is: the number of pieces of information visited by the user decreases, i.e., the number of pieces of information that the user clicks becomes less and less along with time; contrariwise, if the calculated result is a positive value, the information visiting trend is: the number of pieces of information visited by the user increases, i.e., the number of pieces of information that the user clicks becomes more and more along with time.

In a second manner, the information visiting trend is determined according to the following.

An information visiting curve of the user during the time period T is determined, wherein a horizontal abscissa of the information visiting curve is time, and a vertical abscissa of the information visiting curve is the number of pieces of information visited by the user.

A gradient of the information visiting curve is calculated and the information visiting trend is expressed by the gradient, wherein if the gradient is a negative value, the information visiting trend is: the number of pieces of information visited by the user decreases, i.e., the number of pieces of information that the user clicks becomes less and less along with time; contrariwise, if the gradient is a positive value, the information visiting trend is: the number of pieces of information visited by the user increases, i.e., the number of pieces of information that the user clicks becomes more and more along with time.

It should be noted that, in the above manner 1 or 2, one month is taken as an exemplary time period T, if the month has less than 30 days, the first half of the time period T is a first half month, i.e., 1st to 14th, accordingly, the second half of the time period T is the second half month, i.e., 15th to the last day of the month. If the month has more than 30 days (or 30 days), the first half of the time period T is the first half month, i.e., 1st to 15th, the second half of the time period T is the second half month, i.e., 16th to the last day of the month.

At block 103, a target user meeting a condition is selected according to the information visiting parameters of each user during the time period T and information is pushed to the target user.

In one example, block 103 may be implemented as shown in FIG. 3.

FIG. 3 is a flowchart illustrating an implementation of block 103 according to an example of the present disclosure. As shown in FIG. 3, the process includes the following.

At block 301, when information is to be pushed, an information clicking ratio of each user is calculated according to the information visiting parameters of the user during the time period T.

In block 301, the information clicking ratio of the user may be calculated by a following formula:

$$\text{Score} = (\text{click\_rate})^{\alpha} * (\text{trend\_click\_rate})^{\beta} * (\text{last\_click\_date})^{\gamma};$$

wherein score denotes the information clicking ratio of the user, click_rate denotes the number of pieces of information visited by the user during the time period T, trend_click_rate denotes the information visiting trend of the user during the time period T, last_click_date denotes the time of last visit of the user within the time period T, $\alpha$, $\beta$ and $\gamma$ are three weight parameters for balancing contributions of click_rate, trend_click_rate and last_click_date. Detailed values of them may be adjusted at specific time according to a practical requirement, e.g., values of $\alpha$, $\beta$ and $\gamma$ are all 1.

It should be noted that, in the example of the present disclosure, the information visiting trend may be a negative value. In this situation, when the score is calculated according to the above formula, a specific processing may be performed in this example. For example, if the information visiting trend of the user during the time period T is a negative value, the trend_click_rate is configured to a predefined value such as 1. Thus, all potential target users are those clicking more and more information.

At block 302, users are sorted according to their information clicking ratios and a target user meeting a condition is selected in order.

At block 303, information is pushed to the selected target user.

Now the procedure as shown in FIG. 3 is finished.

It should be noted that, in the example of the present disclosure, information is mainly pushed to users visiting much information. But this may lead to: some users may have less and less pushed information, i.e., have a decreased information coverage ratio. In addition, some users may have more and more pushed information (which may disturb the users). Thus there are two problems including user coverage ratio of the information is decreased and some users are disturbed by information. In order to solve these problems, the above condition may be configured as: the number of pieces of information pushed to the user during the time period T is smaller than a preconfigured number N, and/or, a time interval between two adjacent pieces of information is longer than a preconfigured time interval. For example, suppose that the time period T is one month, the condition may be: the number of pieces of information pushed to the user in this month is smaller than 50, and/or, the time interval between two adjacent pieces of information pushed to the user is longer than 1 day. A user meeting the above condition is a target user. Thus, the information may be pushed to users more averagely.

Hereinafter an apparatus provided by an example of the present disclosure is described.

Figure 4:
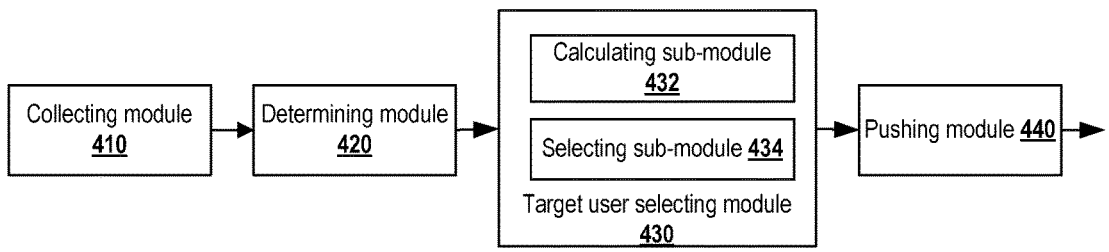
FIG. 4 shows an example of a structure of an apparatus according to the present disclosure.

FIG. 4 shows an example of an apparatus provided by the present disclosure. As shown in FIG. 4, the apparatus includes:

a collecting module 410, to collect pushing parameters of each piece of information pushed during a time period T, wherein the pushing parameters include: time that the information is pushed, users that the information is pushed to and times that the information is clicked;

a determining module 420, to determine information visiting parameters of each user within the time period T according to the collected pushing parameters, wherein the information visiting parameters include at least: number of pieces of information visited by the user, information visiting trend and time of last visit during the time period T, the information visiting trend is determined according to the number of pieces of information visited by the user;

a target user selecting module 430, to select a target user meeting a condition according to the information visiting parameters of each user during the time period T; and a pushing module 440, to push information to the target user selected by the target user selecting module 430.

In the example, the duration of the time period T may be configured according to a practical requirement, e.g., a recent week, a recent month, etc., which is also not restricted in the present disclosure. The determining module 420 may determine the information visiting trend of the user within the time period T via the following:

calculate a difference between the number of pieces of information visited by the user during a second half of the time period T and the number of pieces of information visited by the user during a first half of time period T; determine the information visiting trend according to a calculated result; wherein if the calculated result is a negative value, the information visiting trend is: the number of pieces of information visited by the user decreases; if the calculated result is a positive value, the information visiting trend is: the number of pieces of information visited by the user increases; or determine an information visiting curve of the user within the time period T, wherein a horizontal abscissa of the information visiting curve is time, and a vertical abscissa of the information visiting curve is the number of pieces of information visited by the user; calculate a gradient of the information visiting curve and determine the information visiting trend according to the gradient; wherein if the gradient is a negative value, the information visiting trend is: the number of pieces of information visited by the user decreases; if the gradient is a positive value, the information visiting trend is: the number of pieces of information visited by the user increases.

As shown in FIG. 4, in the example of the present disclosure, the target user selecting module 430 may include:

a calculating sub-module 432, to calculate an information clicking ratio of each user according to the information visiting parameters of the user during the time period T; and a target user selecting sub-module 434, to sort users according to their information clicking ratios in a descending order, and select the target user meeting the condition in turn.

The calculating sub-module 432 may calculate the information clicking ratio of each user according to the information visiting parameters of the user during the time period T:

$$\text{Score} = (\text{click\_rate})^{\alpha} * (\text{trend\_click\_rate})^{\beta} * (\text{last\_click\_date})^{\gamma};$$

wherein score denotes the information clicking ratio of the user, click_rate denotes the number of pieces of information that the user clicks during the time period T, trend_click_rate denotes the information visiting trend of the user during the time period T, if the information visiting trend of the user within the time period T is a negative value, the trend_click_rate is configured to a predefined value, last_click_date denotes the time of last visit of the user within the time period T, α, β and γ are three weight parameters for balancing contributions of click_rate, trend_click_rate and last_click_date.

In the example of the present disclosure, in order to push the information to the users more averagely, the condition may include:

the number of pieces of information pushed to the user within the time period T is smaller than N, and/or, a time interval between two adjacent pieces of information pushed to the user within the time period T is larger than a preconfigured time interval.

Those with ordinary skill in the art would know that some or all blocks of the examples of the present disclosure may be implemented by hardware or by a program executed on relevant hardware. The program may be stored in a machine readable storage medium such as a read only memory, a disk or compact disk, etc.

Figure 5:
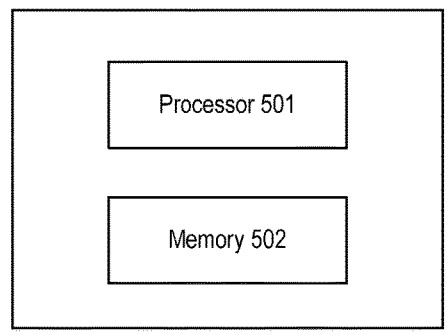
FIG. 5 shows another example of a structure of an apparatus according to the present disclosure.

FIG. 5 shows an example of an apparatus for pushing information according to the present disclosure. The apparatus includes a processor 501 and a memory 502. The memory 502 stores machine readable instructions executable by the processor 501 to perform acts of:

collecting pushing parameters of each piece of information pushed during a time period T, wherein the pushing parameters comprises time that the information is pushed, users that the information is pushed to, and times that the information is visited;

determining information visiting parameters of each user within the time period T according to the collected pushing parameters, wherein the information visiting parameters comprise at least: number of pieces of information visited by the user within the time period T, an information visiting trend and time of last visit within the time period T, the information visiting trend is determined by the number of pieces of information visited by the user; and selecting a target user meeting a condition according to the information visiting parameters of each user within the time period T, and pushing information to the target user In the example of the present disclosure, the processor 501 may execute machine readable instructions stored in the memory 502 to implement all or some processes in the method described above, which is not repeated herein.

In view of the above technical solution, in the examples of the present disclosure, pushing parameters of each piece of information are collected. According to the collected pushing parameters, information visiting parameters of each user within a time period T are determined. As such, when information is to be pushed, it is possible to automatically select a target user meeting a condition according to the information visiting parameters of each user within the time period T and then push the information to the target user. Compared with the conventional technique, automatic selection of the target user is realized. Problems such as operation difficulty brought out by manual selection of the target user are overcome. Further, the present disclosure takes previous visiting information of the users to guide the selection of the target user, which is more likely to select the target user who would like to visit the information and increases the information clicking ratio.

What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

The invention claimed is:

1. A method for pushing information, comprising:
   collecting pushing parameters of each piece of information pushed during a time period T, wherein the pushing parameters comprises time when the information is pushed, users that the information is pushed to, and number of times that the information is visited;
   determining information visiting parameters of each user within the time period T according to the collected pushing parameters, wherein the information visiting parameters comprise at least: number of pieces of the pushed information visited by the user within the time period T, an information visiting trend and time when the user visits the pushed information for the last time within the time period T, the information visiting trend is determined by the number of pieces of the pushed information visited by the user and comprises any one of: the number of pieces of the pushed information visited by the user increases with time, or the number of pieces of the pushed information visited by the user decreases with time; and
   selecting a target user meeting a condition according to the information visiting parameters of each user within the time period T, and pushing information to the target user.

2. The method of claim 1, wherein the information visiting trend is determined by:
   calculating a difference between number of pieces of the pushed information visited by the user during a second half of the time period T and number of pieces of the pushed information visited by the user during a first half of the time period T, determining the information visiting trend according to a calculated result; wherein if the calculated result is a negative value, the information visiting trend is the number of pieces of the pushed information visited by the user decreases; if the calculated result is a positive value, the information visiting trend is the number of pieces of the pushed information visited by the user increases.

3. The method of claim 1, wherein the information visiting trend is determined by:
   determining an information visiting curve of the user during the time period T, wherein a horizontal coordinate of the information visiting curve is time, and a vertical coordinate of the information visiting curve is the number of pieces of the pushed information visited by the user; and
   calculating a gradient of the information visiting curve, and determining the information visiting trend according to the gradient; wherein if the gradient is a negative value, the information visiting trend is the number of pieces of the pushed information visited by the user decreases; if the gradient is a positive value, the information visiting trend increases.

4. The method of claim 1, wherein the selecting the target user meeting the condition according to the information visiting parameter of each user during the time period T comprises:
   calculating an information clicking ratio of each user according to the information visiting parameters of the user during the time period T; and
   sorting users according to their information clicking ratios in a descending order, and selecting the target user meeting the condition in turn.

5. The method of claim 4, wherein the calculating the information clicking ratio of each user according to the information visiting parameter of the user during the time period T comprises:
calculating the information clicking ratio of each user according to a following formula:

Score =(click_rate)$^{\alpha}$* (trend_click_rate)$^{\beta}$* (last_click_date)$^{\gamma}$;

wherein Score denotes the information clicking ratio of the user, click_rate denotes the number of pieces of the pushed information visited by the user during the time period T, trend_click_rate denotes the information visiting trend of the user during the time period T, if the information visiting trend of the user during the time period T is a negative value, the trend_click_rate is configured to a predefined value, last_click_date denotes the time when the user visits the pushed information for the last time during the time period T, and wherein $\alpha$, $\beta$ and $\gamma$ are three weight parameters.

6. The method of claim 1, wherein the condition comprises at least one of: the number of pieces of information pushed to the user within the time period T is below a threshold, and, a time interval between two adjacent pieces of information pushed to the user within the time period T is larger than a preconfigured time interval.

7. An apparatus for pushing information, comprising:
a processor and a memory, wherein the memory comprises machine readable instructions executable by the processor to perform acts of:
collecting pushing parameters of each piece of information pushed within a time period T, wherein the pushing parameters comprise: time when the information is pushed, users to which the information is pushed and number of times that the information is clicked;
determining information visiting parameters of each user within the time period T according to the collected pushing parameters, wherein the information visiting parameters comprise at least: number of pieces of the pushed information visited by the user, information visiting trend and time when the user visits the pushed information for the last time during the time period T, the information visiting trend is determined according to the number of pieces of the pushed information visited by the user and comprises any one of: the number of pieces of the pushed information visited by the user increases with time, or the number of pieces of the pushed information visited by the user decreases with time;
selecting a target user meeting a condition according to the information visiting parameters of each user during the time period T; and
pushing information to the target user selected by the target user selecting module.

8. The apparatus of claim 7, wherein the determining the information visiting trend of the user within the time period T by:
calculating a difference between the number of pieces of the pushed information visited by the user during a second half of the time period T and the number of pieces of the pushed information visited by the user during a first half of time period T; determining the information visiting trend according to a calculated result; wherein if the calculated result is a negative value, the information visiting trend is the number of pieces of the pushed information visited by the user decreases; if the calculated result is a positive value, the information visiting trend is the number of pieces of the pushed information visited by the user increases; or
determining an information visiting curve of the user within the time period T, wherein a horizontal coordinate of the information visiting curve is time, and a vertical coordinate of the information visiting curve is the number of pieces of the pushed information visited by the user; calculating a gradient of the information visiting curve and determine the information visiting trend according to the gradient; wherein if the gradient is a negative value, the information visiting trend is the number of pieces of the pushed information visited by the user decreases; if the gradient is a positive value, the information visiting trend is the number of pieces of the pushed information visited by the user increases.

9. The apparatus of claim 7, wherein the selecting comprises:
calculating an information clicking ratio of each user according to the information visiting parameters of the user during the time period T; and
sorting users according to their information clicking ratios in a descending order, and selecting the target user meeting the condition in turn.

10. The apparatus of claim 7, wherein the condition comprises at least one of: the number of pieces of information pushed to the user within the time period T is below a threshold, and, a time interval between two adjacent pieces of information pushed to the user within the time period T is larger than a preconfigured time interval.

11. An apparatus for pushing information, comprising: a processor and a memory, wherein the memory comprises machine readable instructions executable by the processor to perform acts of:
collecting pushing parameters of each piece of information pushed during a time period T, wherein the pushing parameters comprises time when the information is pushed, users that the information is pushed to, and number of times that the information is visited;
determining information visiting parameters of each user within the time period T according to the collected pushing parameters, wherein the information visiting parameters comprise at least: number of pieces of the pushed information visited by the user within the time period T, an information visiting trend and time when the user visits the pushed information for the last time within the time period T, the information visiting trend is determined by the number of pieces of the pushed information visited by the user and comprises any one of: the number of pieces of the pushed information visited by the user increases with time, or the number of pieces of the pushed information visited by the user decreases with time; and
selecting a target user meeting a condition according to the information visiting parameters of each user within the time period T, and pushing information to the target user.

12. The apparatus of claim 11, wherein the memory further comprises machine readable instructions executable by the processor to perform acts of:
calculating a difference between number of pieces of the pushed information visited by the user during a second half of the time period T and number of pieces of the pushed information visited by the user during a first half of the time period T, determining the information visiting trend according to a calculated result; wherein if the calculated result is a negative value, the information visiting trend is the number of pieces of the pushed information visited by the user decreases; if the calculated result is a positive value, the information visiting trend is the number of pieces of the pushed information visited by the user increases.

13. The apparatus of claim 11, wherein the memory further comprises machine readable instructions executable by the processor to perform acts of:

determining an information visiting curve of the user during the time period T, wherein a horizontal coordinate of the information visiting curve is time, and a vertical coordinate of the information visiting curve is the number of pieces of information visited by the user;

calculating a gradient of the information visiting curve, and determining the information visiting trend according to the gradient; wherein if the gradient is a negative value, the information visiting trend is the number of pieces of the pushed information visited by the user decreases; if the gradient is a positive value, the information visiting trend increases.

14. The apparatus of claim 11, wherein the memory further comprises machine readable instructions executable by the processor to perform acts of:

calculating an information clicking ratio of each user according to the information visiting parameters of the user during the time period T; and sorting users according to their information clicking ratios in a descending order, and selecting the target user meeting the condition in turn.

15. The apparatus of claim 11, wherein the memory further comprises machine readable instructions executable by the processor to perform acts of:

calculating the information clicking ratio of each user according to a following formula:

$$Score = (click\_rate)^{\alpha} * (trend\_click\_rate)^{\beta} * (last\_click\_date)^{\gamma}$$

wherein Score denotes the information clicking ratio of the user, click_rate denotes the number of pieces of the pushed information visited by the user during the time period T, trend_click_rate denotes the information visiting trend of the user during the time period T, if the information visiting trend of the user during the time period T is a negative value, the trend_click_rate is configured to a predefined value, last_click_date denotes the time when the user visits the pushed information for the last time during the time period T, and wherein $\alpha$, $\beta$ and $\gamma$ are three weight parameters.

16. The apparatus of claim 11, wherein the condition comprises at least one of: the number of pieces of information pushed to the user within the time period T is below a threshold, and, a time interval between two adjacent pieces of information pushed to the user within the time period T is larger than a preconfigured time interval.

\* \* \* \* \*